Oct. 20, 1970  R. G. COSS  3,535,026
APPARATUS FOR MEASURING THE DILATION OF THE PUPIL
Filed June 27, 1968

INVENTOR
RICHARD G. COSS
BY Cushman, Darby & Cushman
ATTORNEYS

United States Patent Office 3,535,026
Patented Oct. 20, 1970

---

3,535,026
APPARATUS FOR MEASURING THE DILATION OF THE PUPIL
Richard G. Coss, 39 Avenue d'Iena, Paris, France
Filed June 27, 1968, Ser. No. 740,538
Claims priority, application France, June 29, 1967, 112,440
Int. Cl. A61b 3/10
U.S. Cl. 351—1    4 Claims

ABSTRACT OF THE DISCLOSURE

Apparatus for measuring the dilation of the pupil of an eye including an eyepiece having an opaque screen provided with two rectilinear slots which are not parallel, through which an adjustable optical system makes it possible to read a graduation inscribed on a frosted plate illuminated by a lamp.

---

This invention relates to apparatus for measuring the relative dilation of the pupil of an eye in response to pictorial stimulation.

Recent studies have shown that the dilation of the pupil does not depend solely on ambient lighting. In fact, it has been found that the pupil reflects the interest taken by the subject with regard to what the subject is looking at, whether this is an object, an animal, a person or any other kind of view.

It has been established that the greater the interest taken in what the subject is looking at, the greater will be the dilation of the pupil.

Now, this dilation does not seem to be capable of being controlled by the will of the subject, and therefore would tend to reflect his feelings faithfully.

It will be appreciated just what advantage may be drawn from this measurement of the dilation of the pupil in various fields such as physiology, phychoanalysis, ethology and even commercial promotion.

Therefore, one object of the invention is to provide a simple apparatus whereby a subject measures the relative dilation of his pupil as a function of what he is looking at.

A method has already been used for this purpose which consists of placing before the eye a card perforated with two small holes near one another. The patient then sees two circles of light which may intersect one another according to the dilation of the pupil. For a given dilation, there exists a given spacing of the holes at which the two circles appear to contact. This spacing, therefore, defines a specific dilation.

However, this method is not very practical since the result changes in accordance with the position of the two holes before the pupil, and it is often difficult from several spacings to determine that which corresponds to the dilation of the pupil.

According to the present invention there is provided an apparatus for measuring the relative dilation of the pupil of an eye which includes an eyepiece having an opaque screen, two rectilinear non-parallel slots in the opaque screen, an adjustable optical system, a viewing screen, a scale and means to illuminate the viewing screen and scale, the optical system being arranged between the eyepiece and the viewing screen and being adjustable to enable the scale to be read through the slots.

Other additional features of the invention will be brought out from the description given hereinafter with reference to the accompanying drawings. Of course, the description and drawings are given only by way of example and are not intended to be limiting.

Figure 1:
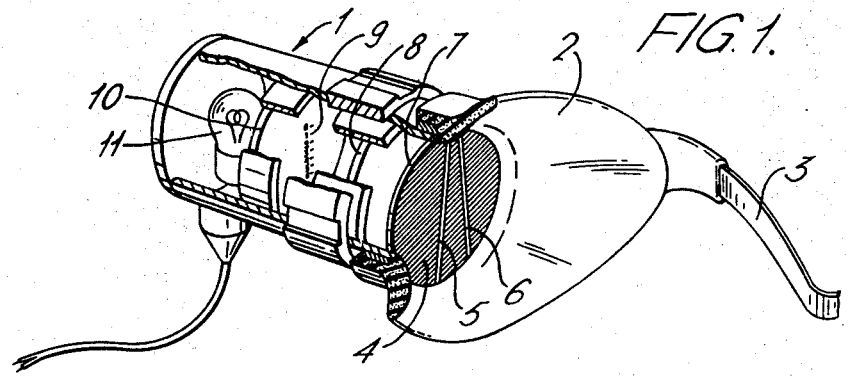
FIG. 1 is a perspective view, partly broken away, of a monocular apparatus according to the invention.

The monocular apparatus according to the invention illustrated in FIG. 1 includes an eyepiece 1 provided with a shade 2 with a strap 3 for fixing against the eye of the subject. The eyepiece 1 has an opaque screen 4 provided with two slots 5 and 6 slightly inclined relatively to one another.

Behind this screen 4 there is an optical system including a first fixed lens 7 and a second movable lens 8 permitting the optical system to be adjusted so as to permit a graduation or scale 9 inscribed on a frosted plate or viewing screen 10 which is illuminated by a lamp 11 to be read. When the subject places the apparatus before one of his eyes and looks with the other eye at an object or anything else, he is able to see and measure in the apparatus, in the way shown in FIGS. 3, 4 and 5, the effect of the dilation of his pupil caused by the interest taken in the object seen by the eye not fitted with the apparatus.

In fact, when the diameter of the pupil increases, the slots 5 and 6 seem wider to the observer owing to diffraction, which causes a reduction of the opaque space seen between the two slots in the form of a wedge F the point of which seem to move along the graduation.

Figure 3:
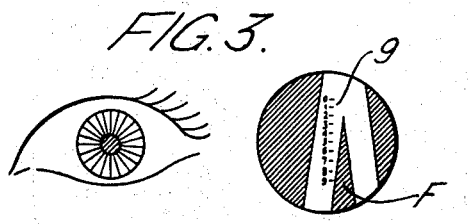
FIGS. 3, 4 and 5 are views showing what is seen in the apparatus according to the invention in accordance with the dilation of the pupil.

In FIG. 3 there is shown the illusion seen initially, of the wedge F superimposed on a numbered scale, when a subject looks into the monocular diffraction pupillometer apparatus of the invention.

Figure 4:
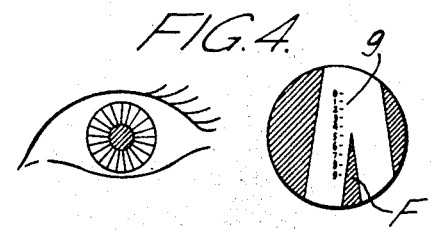

In FIG. 4 the height of the wedge relative to the scale can be seen to have fallen during pupillary dilation activity.

Figure 5:
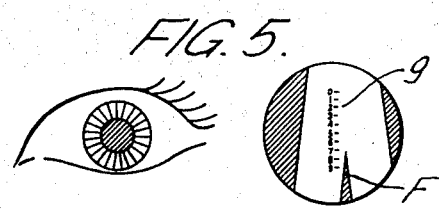

In FIG. 5 the position of the wedge F is illustrated after several seconds of stimulation and at this instant of time the subject reads scale reading indicated by the tip of the wedge.

Figure 2:
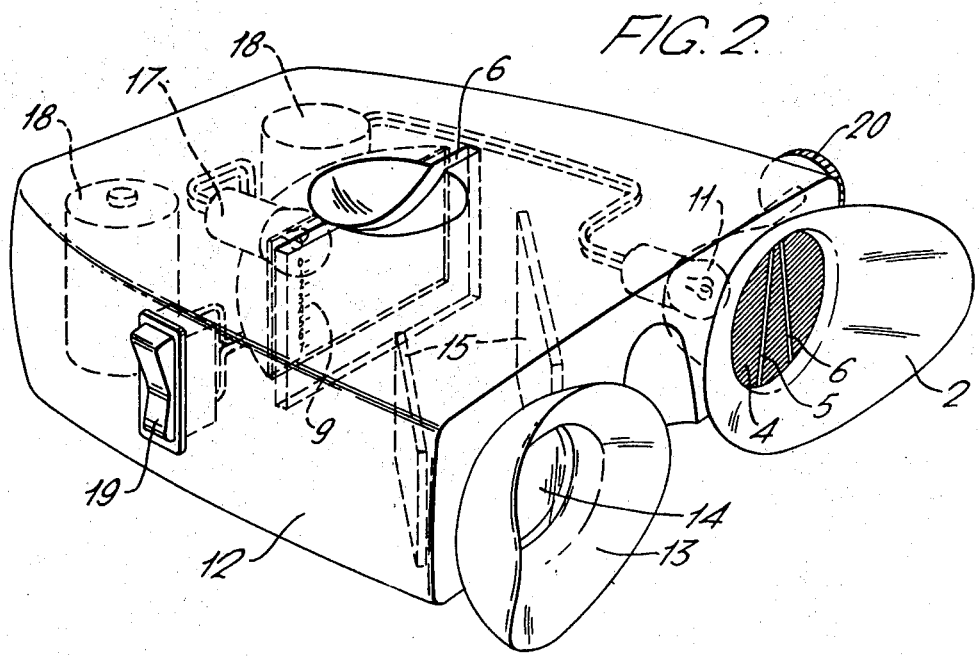
FIG. 2 is a perspective view of a binocular apparatus according to the invention.

When it is desired to make a subject look at photographic diapositives or slides, it is possible to use the binocular apparatus according to the invention which is shown in FIG. 2.

This binocular apparatus comprises a casing 12 provided with a screen 4 having two slots 5 and 6, a shade 2 and a lamp 11. A second shade 13 with an eyepiece 14 makes it possible to see, by means of a set of mirrors 15, a diapositive or slide which is placed in a viewer 16 illuminated by a lamp 17 and held in a support on which the graduation 9 is inscribed.

The casing also contains batteries 18, a switch 19 for supplying the lamps 11 and 17 and a knob 20 for regulating the spacing of the two eyepieces. In this case, there is super-position of the vision of the two eyes, giving the illusion of seeing the graduation 9 along a wedge F, as previously with the monocular apparatus.

To have a satisfactory variation of the length of the arrow F in accordance with the diameter of the pupil, the slots are for example of 0.5 mm. and form an angle of 14°, their spacing varying from 2 to 7 mm.

I claim:

1. Apparatus for measuring relative dilation of the pupil of an eye comprising,
    an eyepiece having spaced ends,
    an opaque screen mounted on one of said ends containing two rectilinear non-parallel and non-intersecting slots extending across said screen,
    a viewing screen mounted proximate to the other of said eyepiece ends and mounted axially to said opaque screen, said viewing screen containing scale means calibrated, and oriented such as to produce the measurement of the relative dilation of the pupil of an observer when looking at said viewing screen through the rectilinear slots of said opaque screen, adjustable means positioned between said viewing and opaque screens for enabling said scale means to be read through said slots; and lamp means mounted between said other end and said viewing screen for illuminating said scale means.

2. Apparatus as claimed in claim 1, wherein a second eyepiece is mounted adjacent said eyepiece at a spacing therefrom effective to enable a binocular view to be obtained of said scale means.

3. Apparatus as claimed in claim 2, wherein a casing carries said eyepiece and said second eyepiece, said casing having a slide guide therein, said slide guide carrying a removable viewing screen comprising a removable transparency slide.

4. Apparatus as claimed in claim 1, wherein said viewing screen is a transparency and further comprising means defining two rectilinear slots converging towards one another around said first screen and a second eyepiece mounted adjacent said eyepiece at a spacing therefrom effective to enable a binocular view to be obtained of said scale means.

References Cited

UNITED STATES PATENTS

| 1,070,631 | 8/1913 | Rogers | 351—27 |
| 2,364,793 | 12/1944 | Jobe et al. | 351—36 |
| 2,424,363 | 7/1947 | Miller | 356—214 X |
| 3,425,772 | 2/1969 | Minas | 351—39 |

DAVID SCHONBERG, Primary Examiner

P. A. SACHER, Assistant Examiner

U.S. Cl. X.R.

350—145; 351—17, 36